E. CIARLO.
HYDRAULIC VARIABLE SPEED TRANSMISSION DEVICE.
APPLICATION FILED JULY 3, 1913.
1,111,994.
Patented Sept. 29, 1914.
4 SHEETS—SHEET 1.
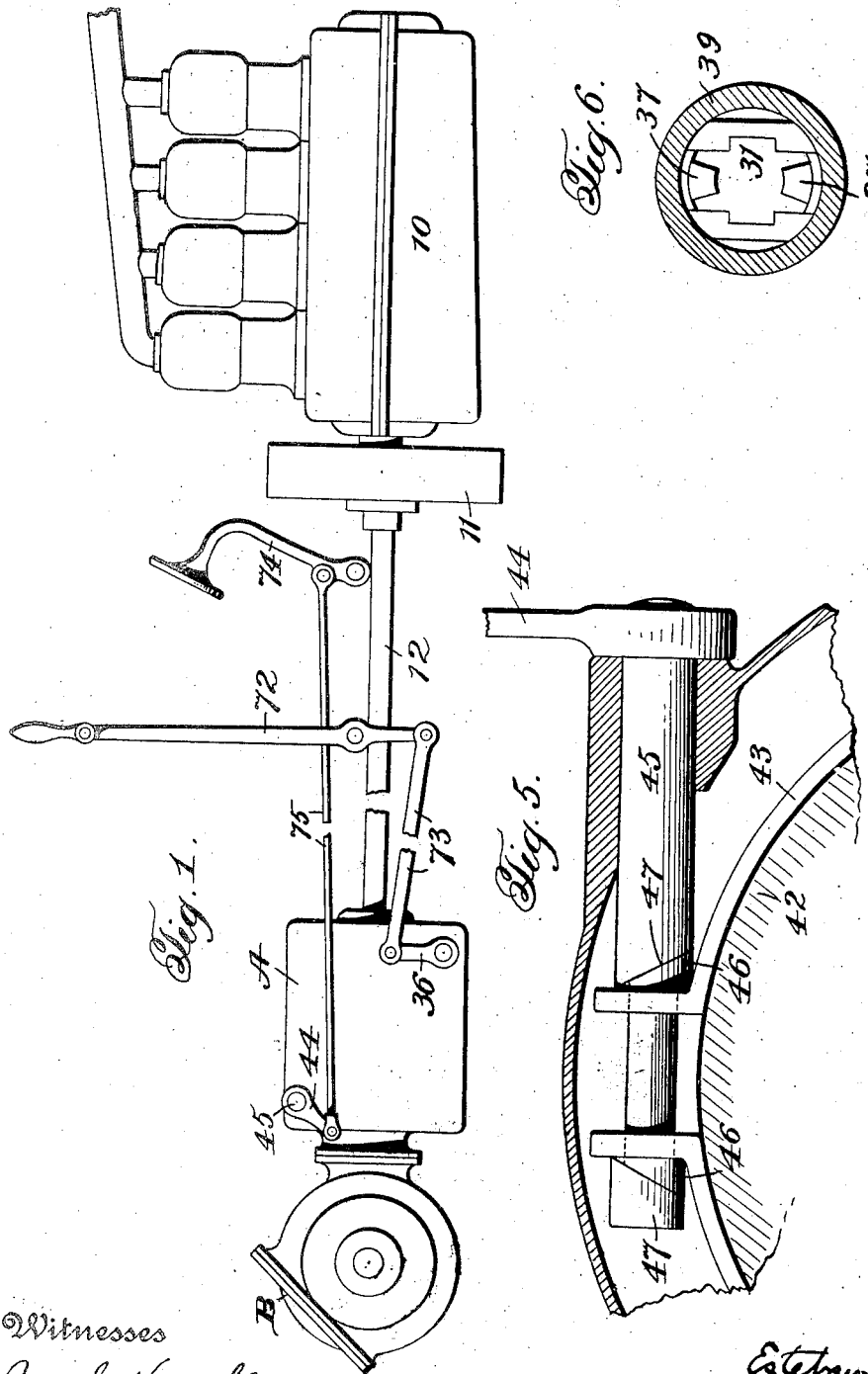

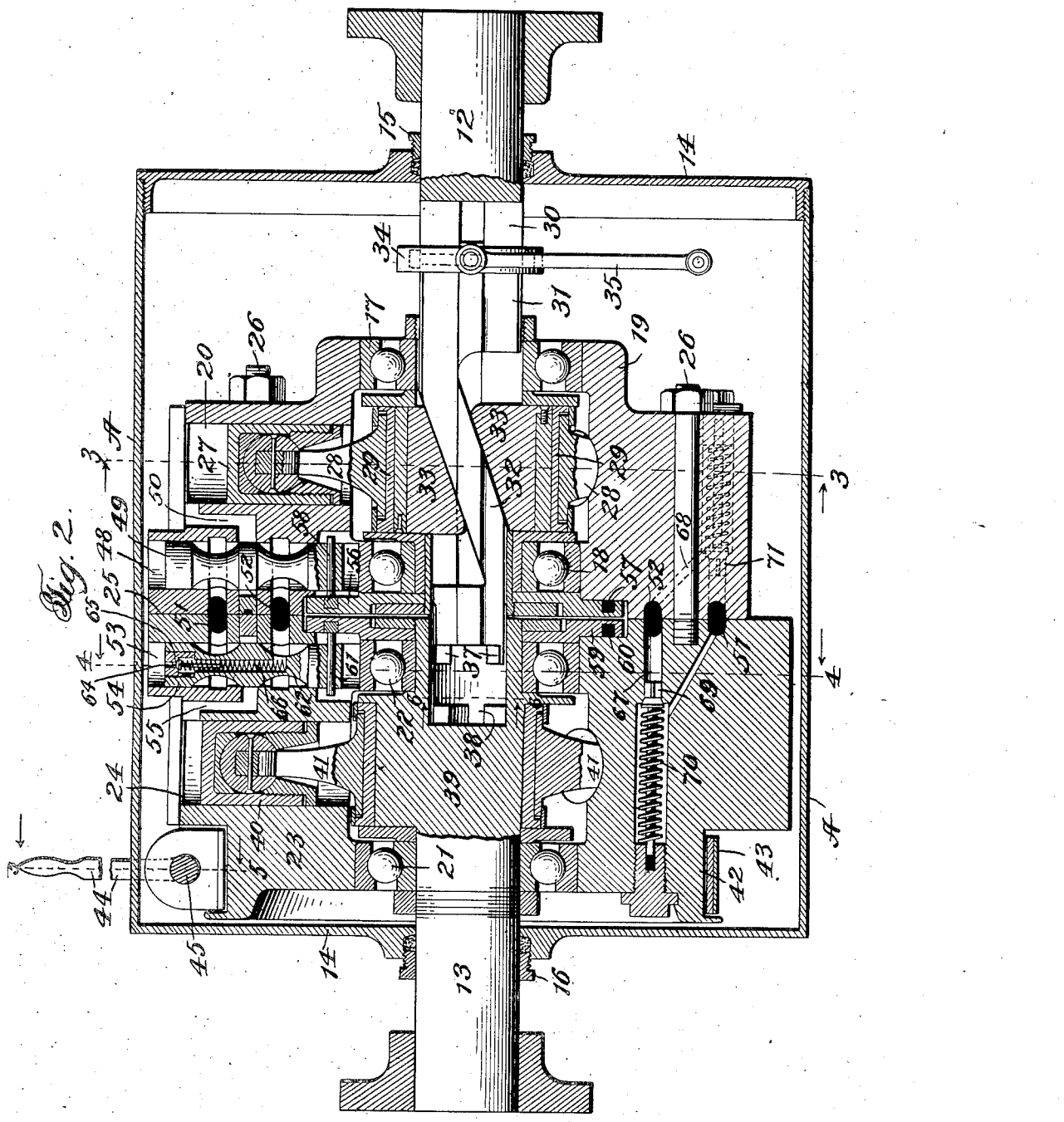

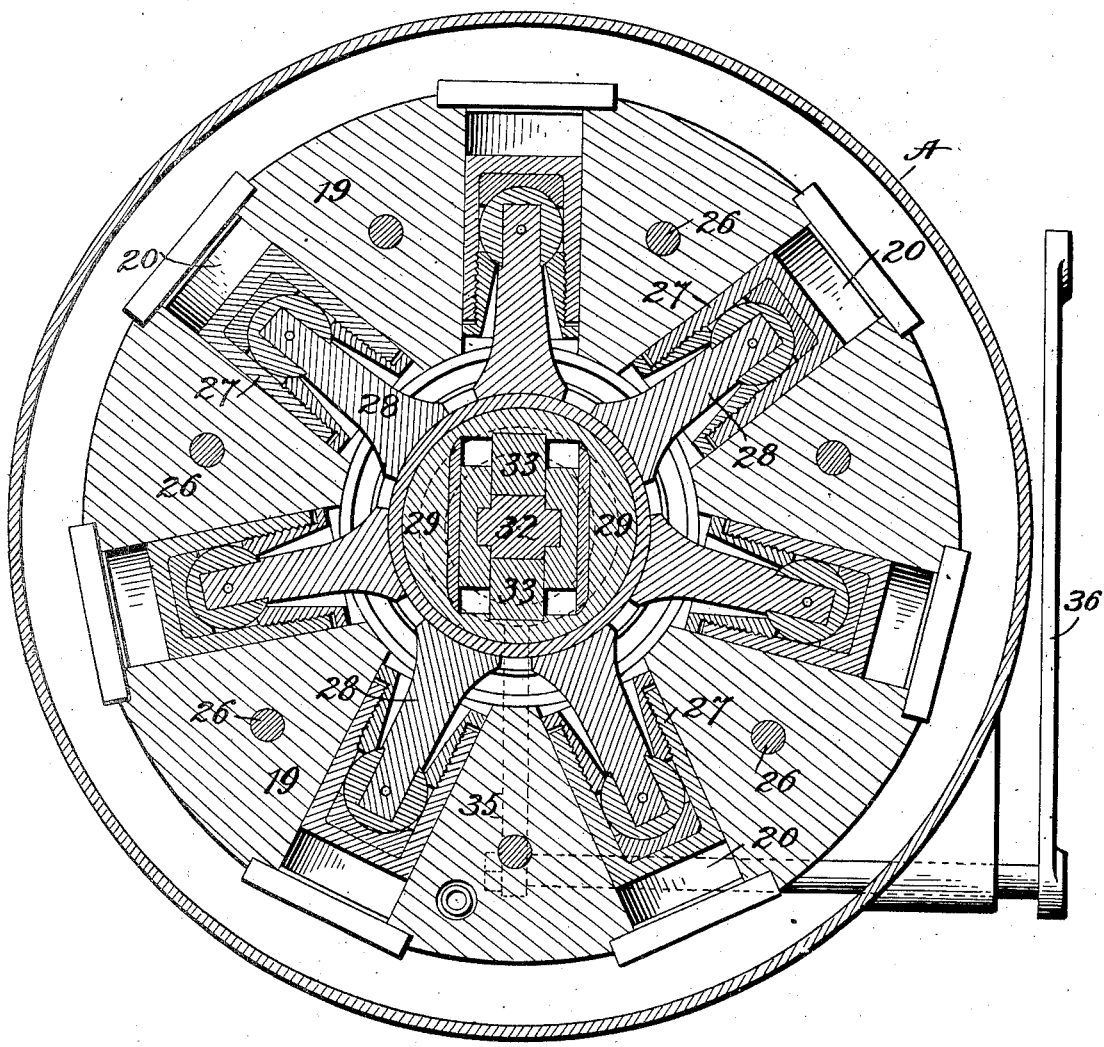

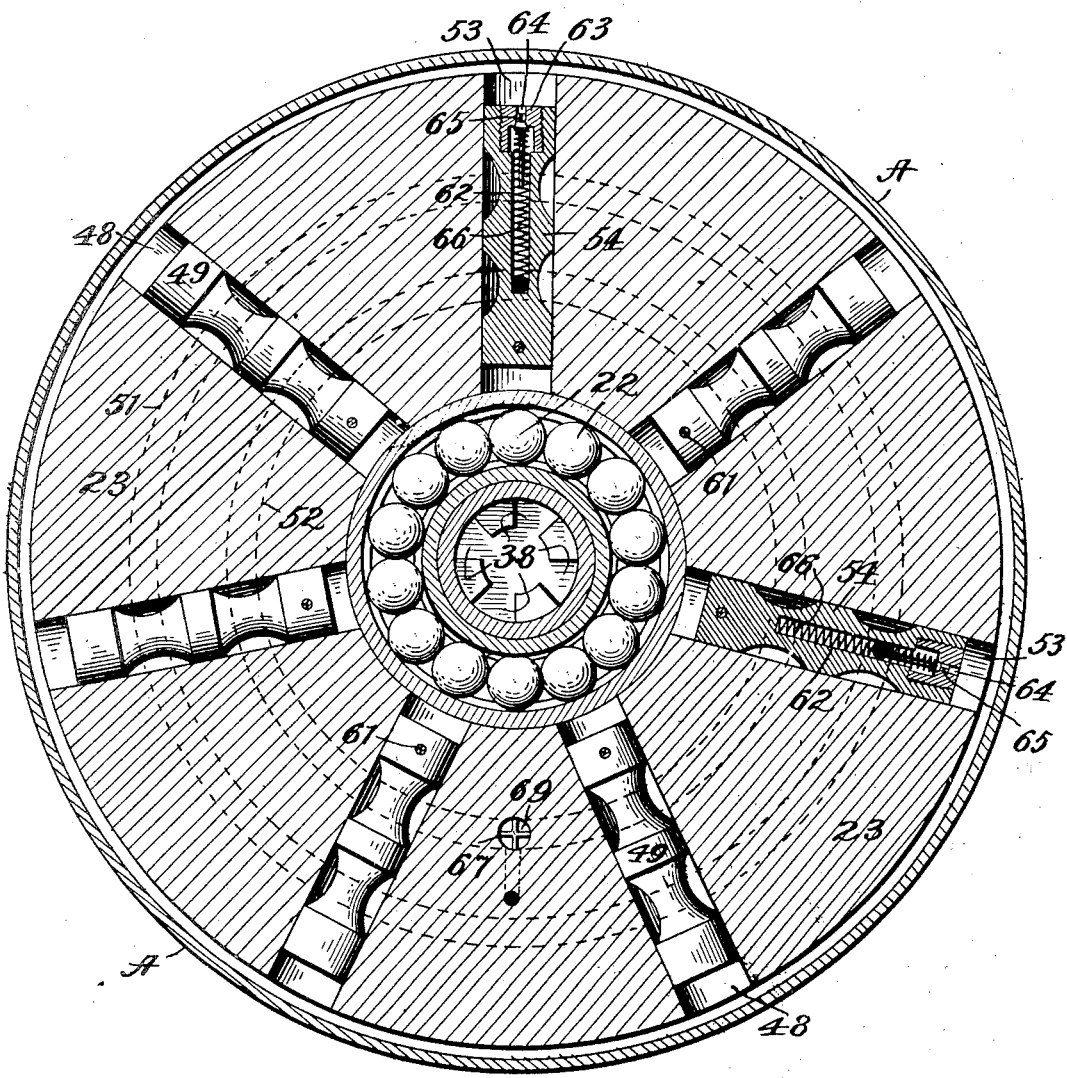

UNITED STATES PATENT OFFICE.

ESTEBAN CIARLO, OF SOUTH BETHLEHEM, PENNSYLVANIA.

HYDRAULIC VARIABLE-SPEED-TRANSMISSION DEVICE.

1,111,994.
Specification of Letters Patent. Patented Sept. 29, 1914.
Application filed July 3, 1913. Serial No. 777,292.

*To all whom it may concern:*

Be it known that I, ESTEBAN CIARLO, a citizen of Argentina, and resident of South Bethlehem, county of Northampton, and State of Pennsylvania, have invented certain new and useful Improvements in Hydraulic Variable-Speed-Transmission Devices, of which the following is a specification.

This invention relates to hydraulic variable speed and reversing mechanism capable of various applications in the arts and especially valuable in motor vehicles for transmitting the power from an internal combustion engine to the driving axle.

One of the objects of the invention is to produce an improved mechanism of this character in which the usual pump and motor employed are normally inoperative, the power under such conditions being transmitted directly from the engine to the driving shaft of the vehicle.

Another object of the invention is to provide a mechanism of this kind of the utmost flexibility and capable of very close regulation and in which all of the parts are practically submerged in oil under all conditions, so that wear will be to a large extent, eliminated.

Another object of the invention is to provide a mechanism of this character in which oil is automatically supplied to the passages connecting the pump and motor cylinders, in order to make up for any loss due to leakage.

Another object of the invention is to provide a mechanism of this character which is adapted to act as a brake for the vehicle.

Other objects are to provide an improved mechanism of this character which is comparatively simple in construction, compact, and which is capable of being manufactured commercially at a reasonable cost.

The novel features of the invention will be hereinafter described in connection with the accompanying drawings which illustrate what I now consider to be the preferred embodiment of my invention, it being understood that the details can be changed in various ways without departing from the spirit of my invention as defined in the claims.

In the drawings, Figure 1 is a side elevation of the driving mechanism as applied to a motor vehicle, the parts being shown more or less diagrammatically; Fig. 2 is a longitudinal section through my improved mechanism; Fig. 3 is a section on the line 3—3 of Fig. 2; Fig. 4 is a transverse section on the line 4—4 of Fig. 2; Fig. 5 is a detail section on the line 5—5 of Fig. 2; Fig. 6 is a detail section on the line 6—6 of Fig. 2.

Referring to Fig. 1, 10 indicates an internal combustion engine of any preferred type, it being understood, however, that any other suitable form of prime mover may be used in place of this engine. The type of prime mover to be used is usually determined by the apparatus to which the invention is to be applied and I have shown the invention in connection with an internal combustion engine because it is at present the common practice to provide motor vehicles with such engines. The motor 10 has the usual fly wheel 11 and the shaft 12 which extends to the variable speed transmission and reversing mechanism A. The driven member of the transmission mechanism A is operatively connected with any suitable type of differential gearing B which may be located on the driving axle of the vehicle or on a jack shaft. The detail construction of the differential gearing B forms no part of the present invention and therefore I have only indicated the same diagrammatically on the drawings.

Referring now to Figs. 2 to 6, it will be seen that in my improved transmission mechanism the driving shaft 12 and the driven shaft 13 are in axial alinement and extend into a closed casing 14 adapted to contain oil. Suitable stuffing boxes 15 and 16 are provided where the shafts pass through the walls of the casing, in order to prevent leakage of the oil along these shafts. The driving shaft 12 has arranged thereon the ball bearings 17 and 18 which rotatably support the casting 19, this casting having formed therein the pump cylinders 20. The driven shaft 13 carries the ball bearings 21 and 22 on which a casting 23 is rotatably mounted. The casting 23 has formed therein the motor cylinders 24 and the adjoining faces of the castings 19 and 23 are finished to form the joint 25, the castings being rigidly secured together by means of suitable bolts 26. The castings 19 and 23 thus constitute a casing which is provided with the pump and motor cylinders and which is rotatable as a whole on the driving and driven shafts 12 and 13. Each of the cylinders 20 has arranged therein a piston 27 and these pistons have connected therewith rods 28 by means of which the pistons are operated from the shiftable eccentric 29. The shaft 12 is provided with a central longitudinal opening 30 in which is arranged a sliding wedge member 31, this wedge member having the inclined portion 32 which is engaged by the wedge blocks 33, the latter being shifted transversely of the shaft 12 by the wedge member when the latter is moved longitudinally of the shaft. The transverse shifting of the wedge blocks 33 effects the shifting of the eccentric 29. The member 31 is connected with a collar 34 slidable on the shaft 12, this collar being moved by a lever 35 of any suitable construction and adapted to be actuated from the exterior of the casing 14. For this purpose I have indicated a control lever 36. The inner end of the wedge member 31 is provided with teeth or claws 37 which are adapted to engage corresponding recesses 38 in the driven shaft 13 and thus form a direct driving connection between the driving and driven shafts when the wedge member is moved inwardly to the extreme position. The driven shaft 13 has formed thereon an eccentric 39 and the pistons 40 in the cylinders 24 are operatively connected with the eccentric 39 by means of the rods 41, so that the shaft 13 will be rotated by means of the pistons 40. The casting 23 has formed thereon the tread or wheel 42 for a brake band 43, the latter being actuated from the exterior of the casing by a lever 44 on a shaft 45. The ends of the brake band carry cams 46 with which cams 47 on the shaft 45 coöperate to contract or release the ends of the brake band when the lever 44 is rocked. It will be obvious from the drawings that when the brake band 43 is contracted the castings 19 and 23 will be held against rotation. Each of the pump cylinders 20 has arranged adjacent thereto a valve chamber 48 in which is arranged a valve 49, the valve chamber being connected with the cylinder by a suitable port or branch 50. The adjoining faces of the castings 19 and 23 are provided with concentric registering grooves which form the passages 51 and 52, branches leading from these passages to all of the valve chambers 48. Each of the motor cylinders 24 has arranged adjacent thereto a valve chamber 53 in which is a valve 54, these chambers being connected with the cylinders by ports or branches 55. The valve chambers 53 are also connected with passages 51 and 52 by suitable ports or branches. The valves 49 and 54 may be actuated by any suitable mechanism and for this purpose I have provided on the end of the driving shaft 12 a cam 56 having a groove 57 in which is arranged one end of the pins 58, these pins being connected with the valves 49. The groove 57 is suitably formed to actuate the valves 49 in their proper sequence to admit and discharge the fluid from the cylinders 20. The driven shaft 13 is similarly provided with a plate 59 having a groove 60 in which the ends of the pins 61 are arranged, these pins being connected with the valves 54. By this construction the pump valves 49 are independently actuated by the driving shaft 12 and the motor valves 54 are independently actuated by the driven shaft 13 and the parts are so arranged that the fluid discharged by the pump cylinders will be admitted to the motor cylinders at the proper time to effect the rotation of the shaft 13. The stroke of the motor pistons 40 is fixed, whereas the stroke of the pump pistons 27 is variable from zero to a maximum in either direction so that the rotation of the shaft 12 can be made to effect any desired speed of rotation of the shaft 13 from zero to a maximum in either direction, the maximum preferably being the speed of the driving shaft 12. The wedge member 31 is shown in the neutral or central position in Fig. 2 and in this position no reciprocation is given to the pistons 27 but when the wedge member is moved in either direction from its central position the pistons 27 will be reciprocated and the direction of reciprocation will depend upon the direction in which the wedge member is moved, the shaft 12 always rotating in the same direction. Two of the valves which control the flow of fluid to the cylinders are preferably provided with longitudinal bores 62 and the bore in one of the valves preferably communicates with the passage 51 and the bore in the other valve communicates with the passage 52. At the outer end of each of these valves there is a plug 63 having an axial port 64 and a seat for a check valve 65. The valve 65 is held against the seat by a spring 66. It will be obvious that the arrangement of the valve 65 is such that the reciprocation of the valves 54 causes the latter to act as pumps to supply oil from the interior of the casing 14 to the passages 51 and 52 and thus make up for any loss due to leakage from the system.

When it is desired to use the transmission mechanism as a brake the wedge member 31 is moved to a position where the pistons 27 will be practically idle and the shaft 13 being driven by the vehicle will cause the motor cylinders 24 to act as pump cylinders and pump the fluid into one of the passages 51 or 52, so that one of these passages will carry a high pressure while the other passage will have a low pressure therein and supply fluid to the cylinders 24 when the pistons move inwardly. In order to by-pass the fluid from one of these passages to the other, under these conditions, I provide the ports 67 and 68. The by-pass 67 has arranged therein a relief valve 69 which is normally held against its seat by a spring 70. This valve permits fluid to flow from the passage 52 to the passage 51 but as will be readily understood from the drawings, prevents flow from the passage 51 to the passage 52. The port 68 is provided with a similar valve 71 which is adapted to permit the fluid to flow from the passage 51 to the passage 52 and to prevent flow in the reverse direction. With this construction and with the eccentric 29 in the neutral position where no motion is transmitted to the pistons 27 the cylinders 24 will act as pumps when the pistons 40 are driven by the vehicle or other driven mechanism and the fluid will be discharged from the cylinders 24 against the pressure with which the valves 69 and 71 are held on their seats so that the motor will, under these conditions, act as a brake to retard the motion of the vehicle or other driven mechanism.

Referring to Fig. 1, it will be observed that the lever 36 for shifting the eccentric 29 is connected with a hand lever 72 by means of a link 73, the lever 72 being located in a position where it may be conveniently handled by the operator of the vehicle. The lever 44 for actuating the brake 43 may be connected with a pedal lever 74 by means of a link 75 so that the brake can be conveniently manipulated by the foot of the operator of the vehicle.

In the operation of the system the brake band 43 is contracted on the wheel 42 and thus holds the casings 19 and 23 against rotation. The driving shaft 12 being operated continuously in the same direction, power may be transmitted to the driven shaft 13 by shifting the wedge member 31 so as to throw the eccentric 29 off the neutral position, thus operating the pump pistons 27. The speed of the shaft 13 will depend upon the stroke of the pistons 27 and the direction of rotation of the shaft 13 will depend upon the direction the eccentric 29 is shifted from the neutral position. The parts are so arranged that when the wedge member 31 is shifted toward the left in Fig. 2 the shaft 13 will rotate in the same direction as the driving shaft 12. Under these conditions the claws 37 may be moved into engagement with the recesses 38 when the speed of the shaft 13 is substantially the same as the speed of the shaft 12 and this occurs just before the parts are moved into engagement. There will thus be a driving connection between the shaft 12 and the shaft 13 and it will not be necessary to operate the pump and motor pistons. By releasing the brake band 43 the casings 19 and 23 will be permitted to rotate with the shafts 12 and 13 and the pistons 27 and 40 will be idle and there will be no wear of the parts of the motor and pump although power is being transmitted from the shaft 12 to the shaft 13. By contracting the brake band 43 the casings 19 and 23 may be stopped and the pump and motor pistons again operated in the usual way.

It will thus be seen that I have provided a system of great flexibility in which, when the cylinders are held by the brake, the pistons may be operated by the driving shaft, and in which, when the driving and driven shafts are coupled together, the cylinders are rotatable with the driving shaft, when the brake is released, and may be rotated by the driven shaft independently of the driving shaft. Since, in the normal operation of a motor vehicle, the power will be generally transmitted directly from the shaft 12 to the shaft 13 and the speed controlled by varying the supply of energy to the prime mover which operates the shaft 12, the wear in the transmission mechanism will be greatly reduced and the life of the same proportionately increased. The invention is also valuable as a means for retarding the vehicle when the latter is coasting. With the vehicle coasting the engine or prime mover may be allowed to run slowly and the adjustable eccentric set to zero. With the parts in this position and the cylinders prevented from revolving by the brake 43, fluid will be pumped by the motor pistons and discharged under pressure through the by-pass, thus loading the driven shaft, which is driven by the vehicle itself under such conditions, and providing a brake which will retard the motion of the vehicle. The eccentric may be adjusted while the parts are in motion to vary the amount of resistance and by partially or wholly releasing the brake 43 the braking effect may be changed. When the adjustable eccentric is at the zero or neutral position the pump cylinders and pistons may revolve entirely independent of the driving shaft.

Having described my invention what I claim and desire to secure by Letters-Patent is, 1. In a hydraulic mechanism of the class described, the combination of a driving member, a pump having pistons, operatively connected with said driving member, and rotatably mounted cylinders, means for adjusting the connection between the pistons and the driving member while the parts are in motion, the parts being so constructed and arranged that the pistons may be operated by the driving member or the cylinders revolved with the driving member or independently thereof, a motor operated by the fluid delivered by said pump, and a driven member operated by said motor.

2. In a hydraulic mechanism of the class described, the combination of a driving member, a pump having pistons, operatively connected with said driving member, and rotatably mounted cylinders, means for adjusting the connection between the pistons and the driving member while the parts are in motion, the parts being so constructed and arranged that the pistons may be operated by the driving member or the cylinders revolved with the driving member or independently thereof, a motor operated by the fluid delivered by said pump and rotatable as a whole with the driving member, and a driven member operated by said motor.

3. In a hydraulic mechanism of the class described, the combination of a driving member, a pump having pistons, operatively connected with said driving member, and rotatably mounted cylinders, means for adjusting the connection between the pistons and the driving member while the parts are in motion, the parts being so constructed and arranged that the pistons may be operated by the driving member or the cylinders revolved with the driving member or independently thereof, a motor operated by the fluid delivered by said pump, and having cylinders rotatable with the pump cylinders, and a driven member operated by said motor.

4. In a hydraulic mechanism of the class described, the combination of a driving member, a pump having pistons operatively connected with said driving member, and rotatably mounted cylinders, means for adjusting the connection between the pistons and the driving member while the parts are in motion, the parts being so constructed and arranged that the pistons may be operated by the driving member or the cylinders revolved with the driving member or independently thereof, a motor having cylinders rigidly secured to said pump cylinders, and pistons adapted to be operated by the fluid delivered by said pump, and a driven member operatively connected with said motor pistons.

5. In a hydraulic mechanism of the class described, the combination of a driving member, a driven member in axial alinement therewith, a casing rotatably mounted with respect to the driving and driven members and having pump and motor cylinders therein, pistons in said cylinders, means operatively connecting the pump pistons with the driving member, means operatively connecting the motor pistons with the driven member, means for holding said casing against rotation, and a clutch for directly connecting the driving and driven members.

6. In a hydraulic mechanism of the class described, the combination of a driving member, a driven member, a casing rotatably mounted with respect to the driving and driven members and having pump and motor cylinders therein, pistons in said cylinders, means operatively connecting said pump pistons with the driving member, means operatively connecting the motor pistons with the driven member, means for holding said casing against rotation, and means for forming a direct driving connection between the driving and driven members.

7. In a hydraulic mechanism of the class described, the combination of an outer casing, a driving member extending into said casing, a driven member extending into said casing in axial alinement with the driving member, a member rotatably mounted with respect to said driving and driven members and having pump and motor cylinders therein, pistons in said cylinders, means operatively connecting the pump pistons with the driving member, means operatively connecting the motor pistons with the driven member, a brake carried by said outer casing and surrounding said member and adapted to hold the latter against rotation, and means for forming a direct driving connection between the driving and driven members.

8. In a hydraulic mechanism of the class described, the combination of an outer casing, a driving member extending into said casing, a driven member extending into said casing in axial alinement with the driving member, a member rotatably mounted with respect to said driving and driven members and having pump and motor cylinders therein, pistons in said cylinder, means operatively connecting the pump pistons with the driving member, means operatively connecting the motor pistons with the driven member, a brake carried by said outer casing and surrounding said member and adapted to hold the latter against rotation, means for forming a direct driving connection between the driving and driven members, and means for releasing said brake to permit said member to rotate.

9. In a hydraulic mechanism of the class described, the combination of an outer casing, a driving member extending into said casing, a driven member extending into said casing in axial alinement with the driving member, a member rotatably mounted on said driving and driven members and having therein pump and motor cylinders, pistons in said cylinders, means operatively connecting the pump pistons with the driving member, means operatively connecting the motor pistons with the driven member, independently actuated valve mechanisms for controlling the flow of fluid to and from said cylinders, a brake carried by the outer casing and adapted to hold said member against rotation, means for forming a direct driving connection between the driving and driven members, and means for controlling said brake to release or stop said member.

10. In a hydraulic mechanism of the class described, the combination of a driving member, a driven member in axial alinement therewith, a casing rotatably mounted on said driving and driven members and having pump and motor cylinders therein, pistons in said cylinders, means operatively connecting the pump pistons with the driving member, means for varying the stroke of the pump pistons, means operatively connecting the motor pistons with the driven member, a brake adapted to hold said casing against rotation, and means for forming a direct driving connection between the driving and driven members.

11. In a hydraulic mechanism of the class described, the combination of a driving member, a casing rotatably mounted on the driving member and having pump cylinders formed therein, a driven member, a casing rotatably mounted on said driven member and having motor cylinders therein, pistons in said cylinders, means operatively connecting said pump pistons with said driving member, means for varying and reversing the stroke of the pump pistons, means operatively connecting the motor pistons with the driven member, means securing said casings together, and a brake adapted to hold said casings against rotation.

12. In a hydraulic mechanism of the class described, the combination of a driving member, a driven member, a member rotatably mounted concentric to said driving and driven members and having therein pump and motor cylinders, pistons in said cylinders, means for operatively connecting the pump pistons with the driving member, means for varying the stroke and for reversing the pump pistons, means operatively connecting the motor pistons with said driven member, valve means for controlling the flow of fluid to and from said cylinders, a pair of separate ports common to said valve means, and a valve controlled by-pass adapted to connect said ports.

13. In a hydraulic mechanism of the class described, the combination of a driving member, a driven member, a member rotatably mounted concentric to said driving and driven members and having therein pump and motor cylinders, pistons in said cylinders, means for operatively connecting the pump pistons with the driving member, means for varying the stroke and for reversing the pump pistons, means operatively connecting the motor pistons with said driven member, valve means for controlling the flow of fluid to and from said cylinders, a pair of separate ports common to said valve means, and separate valve controlled by-passes adapted to permit the fluid to flow from either of said ports to the other.

14. In a hydraulic mechanism of the class described, the combination of a driving member, a driven member, a member rotatably mounted with respect to said driving and driven members and having pump and motor cylinders therein, pistons in said cylinders, means operatively connecting the pump pistons with the driving member, means for varying the stroke of and for reversing the pump pistons, means operatively connecting the motor pistons with said driven member, valve means for controlling the flow of fluid to and from said cylinders, a pair of separate ports communicating with said valve means, a plurality of by-passes for connecting said ports, and spring pressed relief valves for controlling the flow of fluid through said by-passes, said relief valves being also adapted to act as checks to prevent back flow of the fluid.

15. In a hydraulic mechanism of the class described, the combination of a driving member, a driven member, a pump operated by the driving member, a motor for operating the driven member, reciprocating valves for controlling the flow of fluid to and from the pump and motor, one of said valves being provided with a port and a check valve whereby it acts as a pump to supply fluid to said mechanism from the exterior.

16. In a hydraulic mechanism of the class described, the combination of an outer casing adapted to contain a fluid, driving and driven members extending into said casing in axial alinement, a member rotatably mounted on said driving and driven members and having pump and motor cylinders therein, ports connecting said cylinders, reciprocating valves for controlling the flow through said ports, and means whereby one of said valves acts as a pump to supply fluid from said casing to said ports.

17. In a hydraulic mechanism of the class described, the combination of an outer casing adapted to contain fluid, driving and driven members extending into said casing in axial alinement, a member rotatably mounted on said driving and driven members and having pump and motor cylinders therein, a plurality of passages formed in said member and having branches leading to said cylinders, reciprocating valves for controlling the flow of fluid through said branches to and from said passages, and means carried by certain of said valves whereby these valves act as pumps to supply fluid from said casing to said passages.

In testimony whereof I affix my signature in presence of two witnesses.

ESTEBAN CIARLO.

Witnesses:
 JAS. P. MADDEN,
 FRANK A. SULLIVAN.